(12) United States Patent
Takada et al.

(10) Patent No.: US 10,854,358 B2
(45) Date of Patent: Dec. 1, 2020

(54) WIRE HARNESS MANUFACTURING METHOD AND WIRE HARNESS MANUFACTURING DEVICE

(71) Applicant: YAZAKI CORPORATION, Tokyo (JP)

(72) Inventors: Kazuhiko Takada, Shizuoka (JP); Hiroshi Furuya, Shizuoka (JP); Takuya Taniguchi, Shizuoka (JP); Kousuke Masuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 256 days.

(21) Appl. No.: 16/174,204

(22) Filed: Oct. 29, 2018

(65) Prior Publication Data

US 2019/0066881 A1 Feb. 28, 2019

Related U.S. Application Data

(63) Continuation of application No. PCT/JP2017/017037, filed on Apr. 28, 2017.

(30) Foreign Application Priority Data

May 31, 2016 (JP) .................................. 2016-109043

(51) Int. Cl.
*H01R 43/00* (2006.01)
*H01B 13/012* (2006.01)
(Continued)

(52) U.S. Cl.
CPC ....... *H01B 13/01236* (2013.01); *B65G 47/90* (2013.01); *H01B 13/01209* (2013.01);
(Continued)

(58) Field of Classification Search
CPC ........ H01B 13/01236; H01B 13/01209; B65G 47/90; H01R 43/20; H01R 43/048;
(Continued)

(56) References Cited

U.S. PATENT DOCUMENTS 4,976,294 A * 12/1990 Kudo .................... H01R 43/28
29/564.6
5,127,159 A * 7/1992 Kudo .................... H01R 43/20
29/754
(Continued)

FOREIGN PATENT DOCUMENTS

CN 1783599 A 6/2006
CN 101803129 A 8/2010
(Continued)

OTHER PUBLICATIONS

International Search Report and Written Opinion of the International Search Report for PCT/JP2017/017037 dated Jun. 20, 2017.
(Continued)

Primary Examiner — Donghai D Nguyen
(74) Attorney, Agent, or Firm — Kenealy Vaidya LLP

(57) ABSTRACT

A wire harness manufacturing method includes manufacturing a standard-size electric wire in which a terminal-equipped electric wire which is connected to a terminal is manufactured in lot units for each type, clamping the terminal-equipped electric wire to a pair of electric wire clips, dispensing a plurality of terminal-equipped electric wires respectively clamped by the electric wire clamps to electric wire holders, storing the plurality of the terminal-equipped electric wires temporarily in the electric wire holders, locking the both end portions of the terminal-equipped electric wire to an electric wire clip tool respectively and aggregating an electric wire group configuring a wire harness at the electric wire clip tool to form a harness set, and detaching the end portions of the terminal-equipped electric wire from the harness set and inserting the terminal connected and fixed into a terminal accommodating chamber of a connector housing.

4 Claims, 11 Drawing Sheets

(51) Int. Cl.
*B65G 47/90* (2006.01)
*H01R 43/20* (2006.01)
*H01R 43/048* (2006.01)

(52) U.S. Cl.
CPC ........... *H01R 43/20* (2013.01); *H01R 43/048* (2013.01); *Y10T 29/49174* (2015.01)

(58) Field of Classification Search
CPC ......... Y10T 29/49174; Y10T 29/53204; Y10T 29/53209
USPC .......................................... 29/854, 857, 747
See application file for complete search history.

(56) References Cited

U.S. PATENT DOCUMENTS

| | | | |
|---|---|---|---|
| 5,208,977 A * | 5/1993 | Ricard | G02B 6/3833 29/857 |
| 5,606,795 A | 3/1997 | Ohba et al. | |
| 5,659,949 A | 8/1997 | Ohba et al. | |
| 5,774,981 A * | 7/1998 | Maejima | H01R 43/20 29/753 |
| 2010/0186212 A1 | 7/2010 | Dohmen et al. | |
| 2012/0037402 A1 | 2/2012 | Kawase | |

FOREIGN PATENT DOCUMENTS

| | | |
|---|---|---|
| CN | 102714362 A | 10/2012 |
| CN | 103415966 A | 11/2013 |
| CN | 104701707 A | 6/2015 |
| EP | 2 790 191 A1 | 10/2014 |
| JP | 6-223646 A | 8/1994 |
| JP | 7-21852 A | 1/1995 |
| JP | 2003-303521 A | 10/2003 |
| WO | 2010/038488 A1 | 4/2010 |
| WO | 2013/111369 A1 | 8/2013 |

OTHER PUBLICATIONS

Chinese Office Action for the related Chinese Patent Application No. 201780026357.9 dated Jun. 4, 2019.

* cited by examiner

WIRE HARNESS MANUFACTURING METHOD AND WIRE HARNESS MANUFACTURING DEVICE

CROSS REFERENCE TO RELATED APPLICATIONS

This application is a continuation of PCT application No. PCT/JP17/017037, which was filed on Apr. 28, 2017 based on Japanese Patent Application (No. 2016-109043) filed on May 31, 2016, the contents of which are incorporated herein by reference.

BACKGROUND OF THE INVENTION

Field of the Invention

The present invention relates to a wire harness manufacturing method and a wire harness manufacturing device.

Description of Related Art

As a wire harness manufacturing method, there has been known a set-type wire harness manufacturing method, in which a plurality of types of electric wires are manufactured according to each type in lot units and are temporarily stored in predetermined electric wire holders in the order of lots; one electric wire is taken out from the electric wire holders with one end or both end portions thereof locked by a predetermined electric wire clip of an electric wire clamp tool; the electric wires are taken out one by one from each electric wire holder, and likewise locked to other electric wire clips, such that a crossed harness set is formed by aggregating an electric wire group which configures the wire harness at the electric wire clamp tool (see Patent Document 1: JP-A-6-223646). According to such a manufacturing method, it is possible to obtain a product having a quality equivalent to the quality of a product of an automated device by eliminating the loss during or between manufacturing steps from preparation of the standard-size electric wire to case fitting.

Patent Document 1: JP-A-6-223646

According to a related art, in a set-type wire harness manufacturing method, after a manufacturing step in which standard-size electric wires are manufactured in lot units, a storage step in which the electric wires are temporarily stored in the predetermined electric wire holders in the order of lots, and an electric wire driving step in which a harness set is formed, each terminal is inserted into a housing by a worker. For this reason, the orientations of the terminals are not maintained between each of the steps, and the workability is thus not good when the terminals are inserted into terminal accommodating chambers of the housings. Further, since the orientations of the terminals are not unified, it is difficult to insert the terminals into the terminal accommodating chambers by an automatic terminal inserting device. In the above set-type manufacturing method, a lot of manual work is still to be done by workers, so that the production efficiency is not good.

SUMMARY

One or more embodiments provide a wire harness manufacturing method and a wire harness manufacturing device which can facilitate the insertion of a terminal into a terminal accommodating chamber of a housing and are capable of improving the flexibility of system design.

In accordance with one or more embodiments, a wire harness manufacturing method according to the present invention is characterized by the following (1) to (3).

(1) A wire harness manufacturing method comprising:

manufacturing a standard-size electric wire in which a terminal-equipped electric wire which is connected to a terminal at least at one end is manufactured in lot units for each type;

clamping the terminal-equipped electric wire to a pair of electric wire clips of an electric wire clamp so as to dispose both end portions to be adjacent in a same direction and form the terminal-equipped electric wire in a U shape;

dispensing a plurality of terminal-equipped electric wires respectively clamped by the electric wire clamps to electric wire holders for each type;

storing the plurality of the terminal-equipped electric wires temporarily in the electric wire holders for each type through the plurality of electric wire clamps aligned in a row so that a plurality of the both end portions face upward in parallel;

locking the both end portions of the terminal-equipped electric wire clamped by the electric wire clamp taken out from the electric wire holder to an electric wire clip tool respectively, and aggregating an electric wire group configuring a wire harness at the electric wire clip tool so as to form a harness set; and detaching the end portions of the terminal-equipped electric wire from the harness set in a predetermined order and inserting the terminal connected and fixed into a terminal accommodating chamber of a connector housing.

(2) The wire harness manufacturing method according to (1), wherein the wire harness manufacturing method further comprises selecting and taking out at least one of the electric wire clamps clamping the terminal-equipped electric wire which is predetermined from the plurality of electric wire holders aligned in parallel for each type, before locking the both end portions of the terminal-equipped electric wire and aggregating the electric wire group configuring the wire harness at the electric wire clip tool.

(3) The wire harness manufacturing method according to (1) or (2), wherein the wire harness manufacturing method further comprises inspecting connection state of the terminals which are connected and fixed to the end portions of the terminal-equipped electric wire, after clamping the terminal-equipped electric wire.

(4) A wire harness manufacturing device comprising:

a standard-size electric wire manufacturing device in which a terminal-equipped electric wire which is connected to a terminal at least at one end is manufactured in lot units for each type;

an electric wire clamp which includes a pair of electric wire clips which clamps the terminal-equipped electric wire respectively so as to dispose both end portions to be adjacent in a same direction and form the terminal-equipped electric wire in a U shape;

a dispensing device which dispenses a plurality of terminal-equipped electric wires clamped by the electric wire clamp respectively for each type;

an electric wire holder which temporarily stores the plurality of terminal-equipped electric wires for each type through the plurality of electric wire clamps aligned in a row so that a plurality of the both end portions of the terminal-equipped electric wires clamped by the pair of electric wire clips respectively face upward in parallel;

a take-out device which selects and takes out at least one of the electric wire clamps which clamp the terminal-equipped electric wires which is predetermined for each type from a supply stand where the plurality of electric wire holders are aligned in parallel;

an electric wire driving device in which the both end portions of the terminal-equipped electric wire clamped by the electric wire clamp taken out from the electric wire holder are locked to an electric wire clip tool respectively, and an electric wire group configuring a wire harness is aggregated at the electric wire clip tool so as to forms a harness set; and an automatic terminal inserting device which detaches the end portions of the terminal-equipped electric wire from the harness set in a predetermined order and inserts the terminals which are connected and fixed into a terminal accommodating chamber of a connector housing.

In the wire harness manufacturing method of the above configuration (1), both end portions of a terminal-equipped electric wire is in a state of being clamped by an electric wire clamp, since a gripping direction with respect to the terminals is maintained while the rotation around the axial direction is suppressed, it is possible to easily insert a terminal into a terminal accommodating chamber of a connector housing. Therefore, it is easy to insert the terminal into the terminal accommodating chamber of the connector housing by an automatic terminal inserting device.

Further, a plurality of terminal-equipped electric wires temporarily stored in the electric wire holder by the electric wire clamp can be delivered to the next step either by the unit of electric wire holder or the unit of electric wire clamp, and thus the flexibility of system design is high.

In the wire harness manufacturing method of the above configuration (2), the electric wire clamp holding the predetermined terminal-equipped electric wire is suitably taken out from a plurality of electric wire holders for each type stocked in the take-out step.

Therefore, it is possible to deliver a plurality of electric wire clamps in a predetermined order corresponding to the harness set to the next electric wire driving step in a side-by-side state, and it is possible to reduce additional work of the workers, such as carrying, sorting, etc.

In the wire harness manufacturing method of the above configuration (3), it is possible to automate an intermediate inspection for inspecting the connection state of the terminals, and it is possible to improve the quality and productivity.

In addition, in the inspection step, both end portions of the terminal-equipped electric wire are held in the same direction in close proximity by the electric wire clamp, and the connection state of the terminals connected to both portions can be collectively inspected by a camera.

Moreover, it is possible to arrange the camera at optimal positions (for example, obliquely upward positions which do not interfere with other devices) with respect to both end portions of the terminal-equipped electric wire by performing camera inspection during the dispensing step.

Further, in order to achieve the above object, the wire harness manufacturing device according to the present invention is characterized by the following (4).

In the wire harness manufacturing device of the above configuration (4), both end portions of the terminal-equipped electric wire are in a state of being clamped by an electric wire clamp, the gripping direction with respect to the terminals is maintained and the rotation around the axial direction is suppressed. Therefore, it is possible to insert the terminal into the terminal accommodating chamber of the connector housing by the automatic terminal inserting device, and thus the productivity can be improved through labor saving of production personnel.

According to one or more embodiments, a wire harness manufacturing method and a manufacturing device which can facilitate the insertion of the terminal into the terminal accommodating chamber of a housing and can improve the flexibility of designing a system can be provided.

The one or more embodiments have been briefly described above. Further, details of the present invention will be clarified by reading a mode for carrying out the invention described below with reference to accompanying drawings.

DETAILED DESCRIPTION

Exemplary embodiments are described with reference to the drawings.

FIGS. 1A to 1F are schematic configuration diagrams showing an overall configuration of a wire harness manufacturing device according to the present embodiment.

As shown in FIGS. 1A to 1F, a wire harness manufacturing device 1 according to the present embodiment is provided with an electric wire lot preparing device 2, an electric wire set rearrangement device 3, and an automatic terminal inserting device 4.

Figure 2:
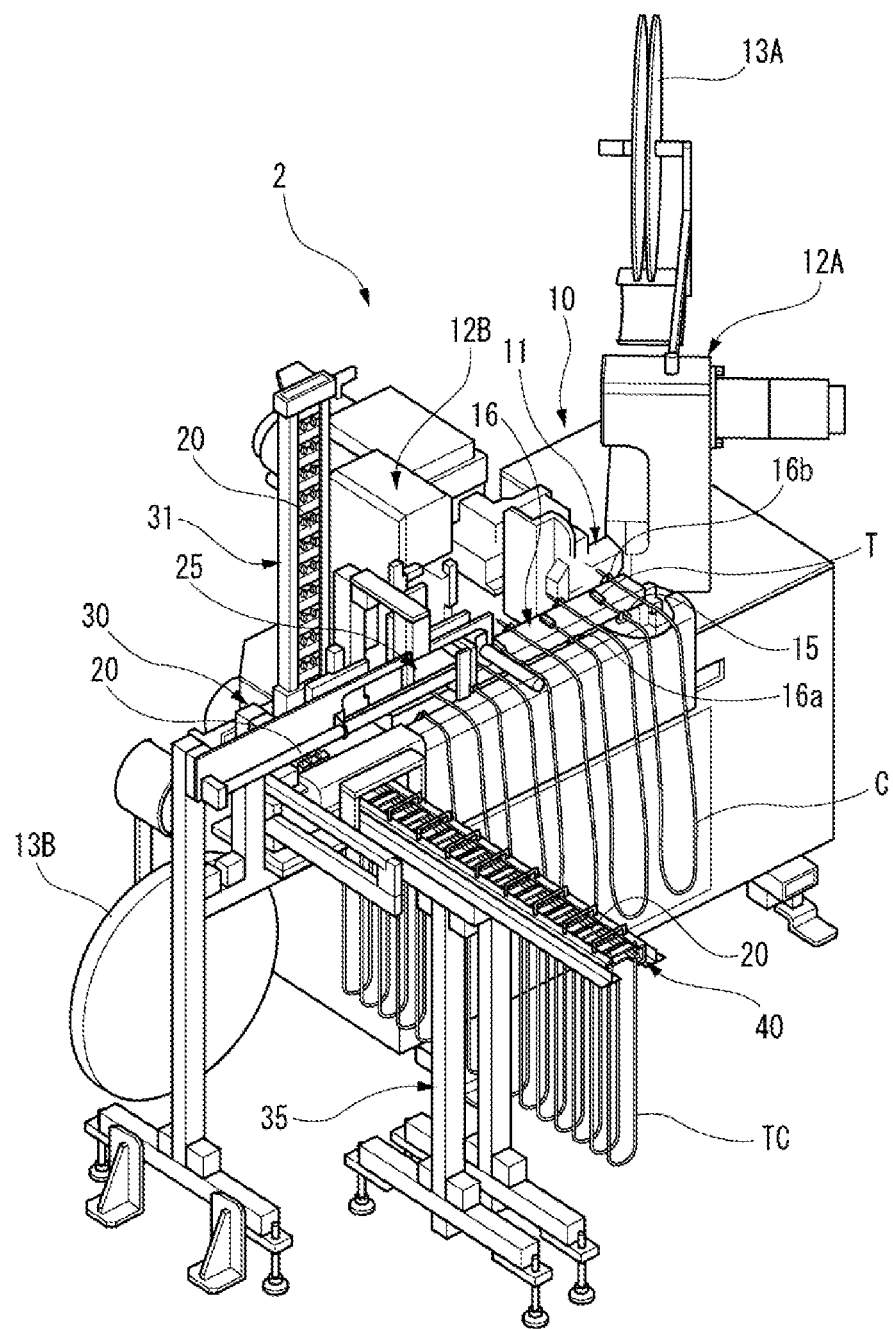
FIG. 2 is a perspective view of an electric wire lot preparing device shown in FIGS. 1A to 1F.

As shown in FIG. 2, the electric wire lot preparing device 2 of the present embodiment is provided with a standard-size electric wire preparing device 10, a clamp device 25, a dispensing device 30, and an electric wire holder 40 holding electric wire clamps 20.

The standard-size electric wire preparing device 10 is provided with a cutting device 11 and two crimping devices 12A and 12B.

First, a terminal T is crimped by the crimping device 12A to a tip end portion of a long electric wire C supplied from an electric wire supply device which is not shown in the drawings. The terminal T is wound around a reel 13A in a chain terminal state and is sent from the reel 13A to the crimping device 12A.

Then, the tip end portion of the electric wire C to which the terminal T is crimped is held by an electric wire clip 15 of a direction changing device and is performed a U-turn, the tip end portion is then clamped by an electric wire clip 16a of an electric wire conveying device 16. Thereafter, the cutting device 11 feeds out and cuts the electric wire C by a desired length. The rear end portion of the electric wire C cut into a predetermined length is clamped by an electric wire clip 16b of the electric wire conveying device 16. Accordingly, the electric wire C cut into the predetermined length is U-shaped by holding both ends by electric wire clips 16a and 16b.

Next, the terminal T is crimped by the crimping device 12B to the rear end portion of the electric wire C clamped by the electric wire clip 16b intermittently moved by the electric wire conveying device 16. The terminal T is wound around a reel 13B in a chain terminal state and is sent from the reel 13B to the crimping device 12B.

Then, a terminal-equipped electric wire TC of a predetermined length is sent to the clamp device 25, with the terminal T crimped on both end portions thereof. In the standard-size electric wire preparing device 10, the terminal T may also be crimped only on one end portion of the electric wire C, and a waterproof plug may also be inserted before the terminal T is crimped.

Figure 4:
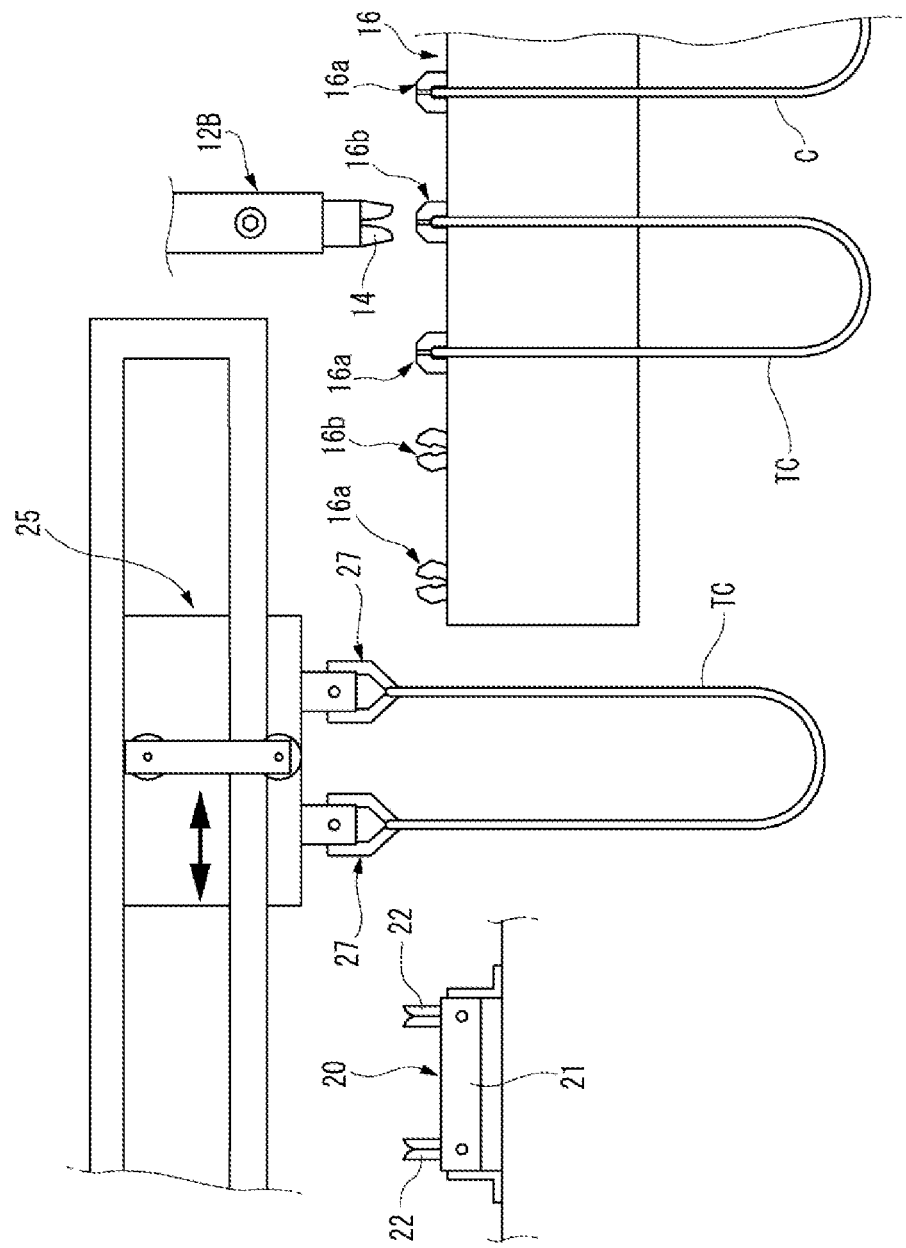
FIG. 4 is a main portion front view of a clamp device in the electric wire lot preparing device shown in FIG. 1.

As shown in FIG. 4, the clamp device 25 grips and conveys both end portions of the terminal-equipped electric wire TC which is held in a U-shape by the electric wire clips 16a and 16b of the electric wire conveying device 16 by a pair of clamps 27, and is clamped to a pair of electric wire clips 22 of the electric wire clamp 20 set in the dispensing device 30 positioned at a downstream side. That is, when the terminal-equipped electric wire TC reaches the downstream end of the electric wire conveying device 16, the clamps 27 of the clamp device 25 grip both end portions of the terminal-equipped electric wire TC, and the electric wire clips 16a, 16b of the electric wire conveying device 16 are released. Then, when the clamp device 25 which moves horizontally to the downstream side reaches the dispensing device 30, the clamps 27 descend to clamp both end portions of the held terminal-equipped electric wire TC by the electric wire clips 22, respectively.

Figure 3:
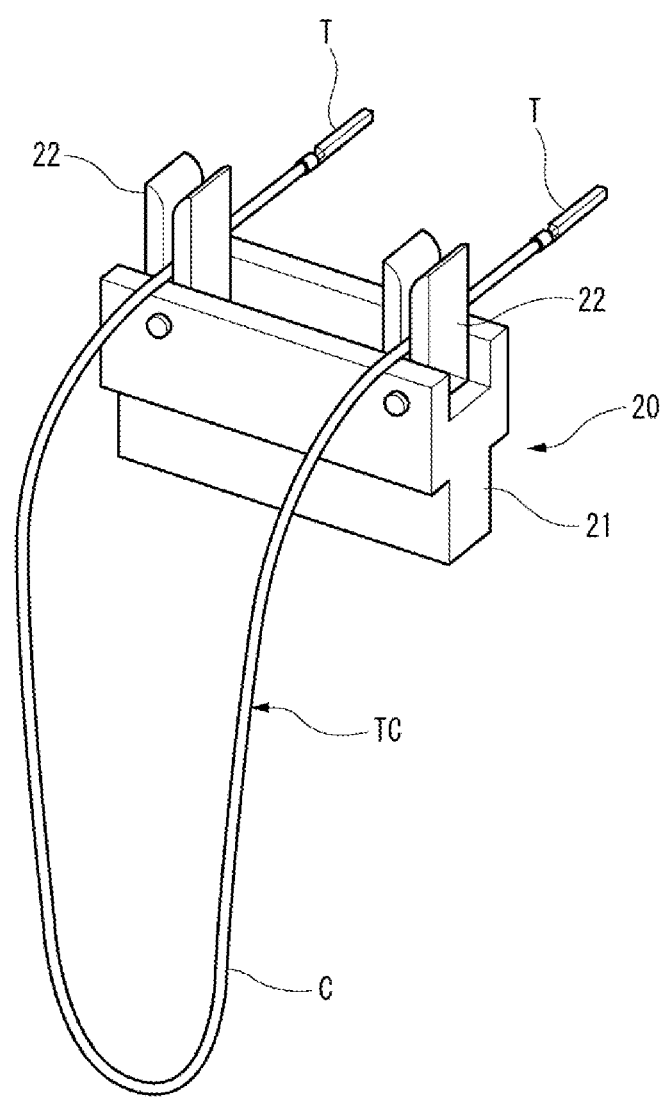
FIG. 3 is a perspective view of an electric wire clamp which holds a terminal-equipped electric wire.

As shown in FIG. 3, the electric wire clamp 20 has a clamp main body 21 and a pair of electric wire clips 22 provided on the upper portion of the clamp main body 21. The electric wire clips 22 are supported and fixed in parallel to the clamp main body 21 at a predetermined interval. In the electric wire clips 22, a pair of clamping pieces is elastically energized in a clamping direction, and both end portions of the terminal-equipped electric wire TC are clamped by these clamping pieces. In the electric wire clamp 20, each electric wire clip 22 clamps the vicinities of both ends of the terminal-equipped electric wire TC, and thus both end portions are brought close to each other and the terminal-equipped electric wire TC is held such that both end portions which are brought close to each other face the same direction in a U shape.

As shown in FIG. 2, the dispensing device 30 is provided with a clamp magazine 31. The clamp magazine 31 accommodates a plurality of electric wire clamps 20 for holding the terminal-equipped electric wire TC, and the electric wire clamps 20 are supplied one by one from the clamp magazine 31. In the dispensing device 30, when the vicinities of both ends of the U-shaped terminal-equipped electric wire TC are clamped by the electric wire clips 22 of the electric wire clamps 20 supplied from the clamp magazine 31, the electric wire clamps 20 are sequentially fed to the electric wire holder 40 placed on the holder base 35. At this time, the electric wire clamp 20 is rotated by 90 degrees to be laid down such that the electric wire clips 22 oriented upward is directed to a lateral side which is the dispensing direction. Accordingly, the terminal-equipped electric wire TC clamped by each electric wire clip 22 of the electric wire clamps 20 is brought into a state in which the terminals T at both end portions thereof are directed upward.

Figure 5:
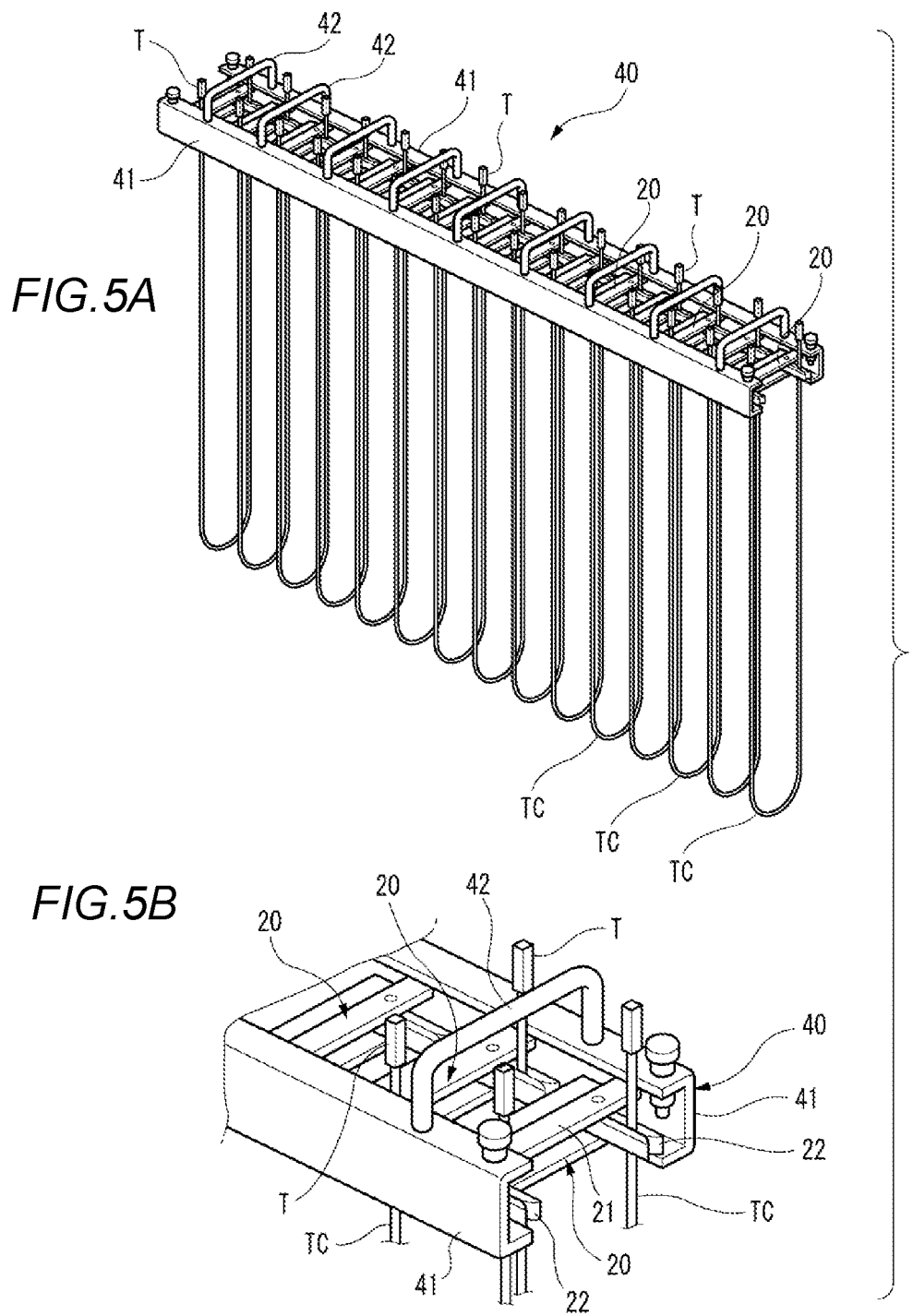
FIG. 5A is a perspective view of an electric wire holder which accommodates the electric wire clamp.
FIG. 5B is a partial enlarged view of the electric wire holder.

As shown in FIGS. 5A and 5B, the electric wire holder 40 is a holder for temporarily storing the plurality of terminal-equipped electric wires TC. The electric wire holder 40 has a pair of holding rails 41 arranged parallel to each other with an interval therebetween and a connecting part 42 connecting the holding rails 41 in a state of being arranged in parallel. Both ends of the clamp main body 21 of the electric wire clamp 20 are accommodated in the electric wire holder 40 in a state of being locked to the holding rails 41.

One end of the electric wire holder 40 is detachable from the dispensing device 30. Electric wire clamps 20 to be dispensed from the dispensing device 30 are sequentially fed to the electric wire holder 40. The electric wire holder 40 accommodates the electric wire clamps 20 dispensed from the dispensing device 30 in a row such that both end portions of the terminal-equipped electric wire TC clamped by the pair of electric wire clips 22 are directed upward and become parallel to each other.

Figure 1:
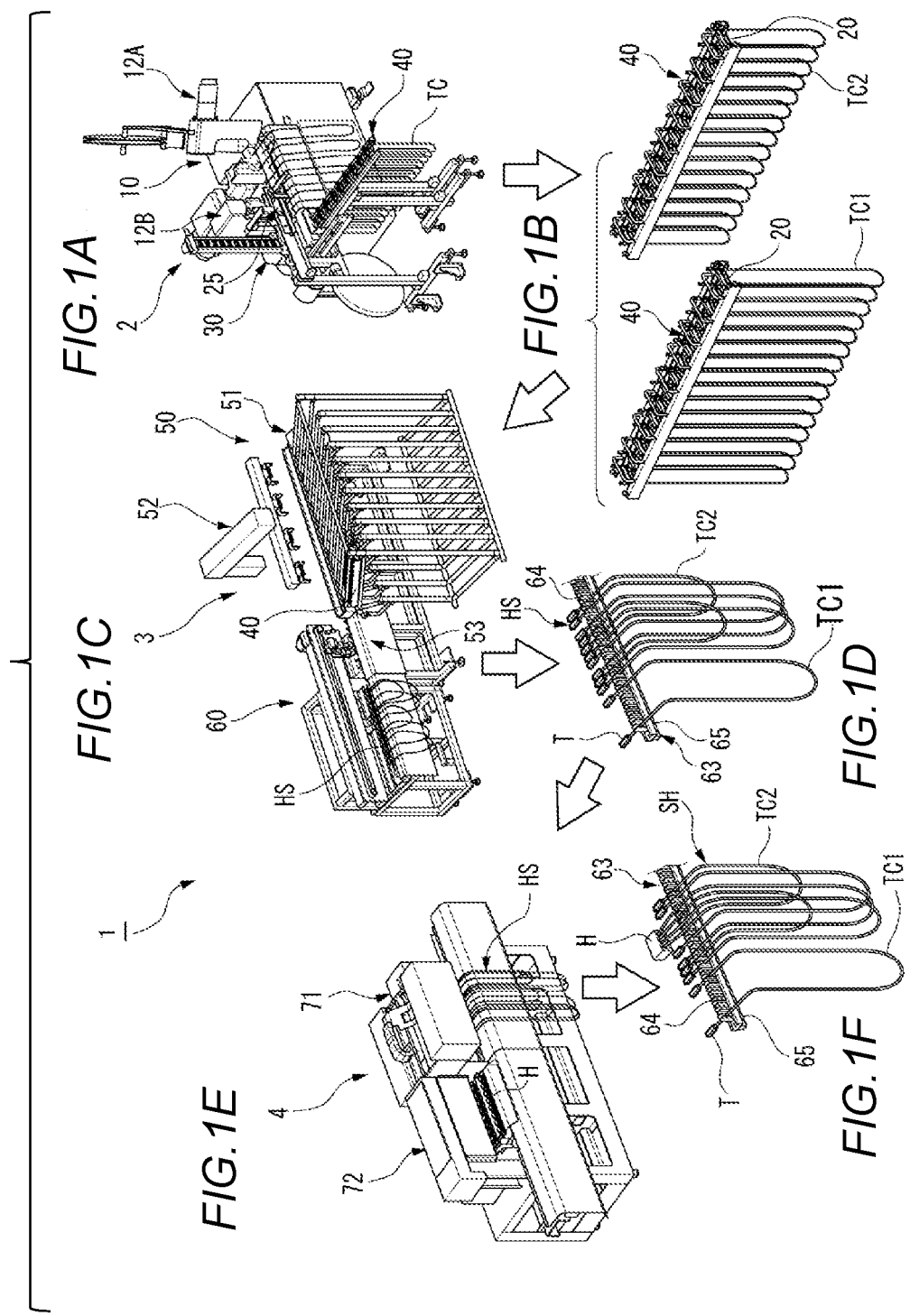
FIGS. 1A to 1F are schematic configuration diagrams showing an overall configuration of a wire harness manufacturing device according to the present embodiment.

In the above-mentioned electric wire lot preparing device 2, the standard-size electric wire preparing device 10 manufactures the terminal-equipped electric wires TC in lot units for each type, and the dispensing device 30 dispenses the plurality of terminal-equipped electric wires TC clamped by the electric wire clamps 20 to each electric wire holder 40 according to each type. Accordingly, as shown in FIG. 1B, a plurality of terminal-equipped electric wires TC1, TC2 are temporarily stored in the plurality of electric wire holders 40 according to each type.

The wire harness manufacturing device 1 is provided with a plurality of electric wire lot preparing devices 2. Accordingly, in the wire harness manufacturing device 1, the plurality of electric wire holders 40 in which the plurality of terminal-equipped electric wires TC are held according to each type are prepared in parallel. The wire harness manufacturing device 1 may also be provided with only one electric wire lot preparing device 2. In this case, in the wire harness manufacturing device 1, the plurality of electric wire holders 40 in which the plurality of terminal-equipped electric wires TC are held according to each type are prepared sequentially by one electric wire lot preparing device 2.

Figure 6:
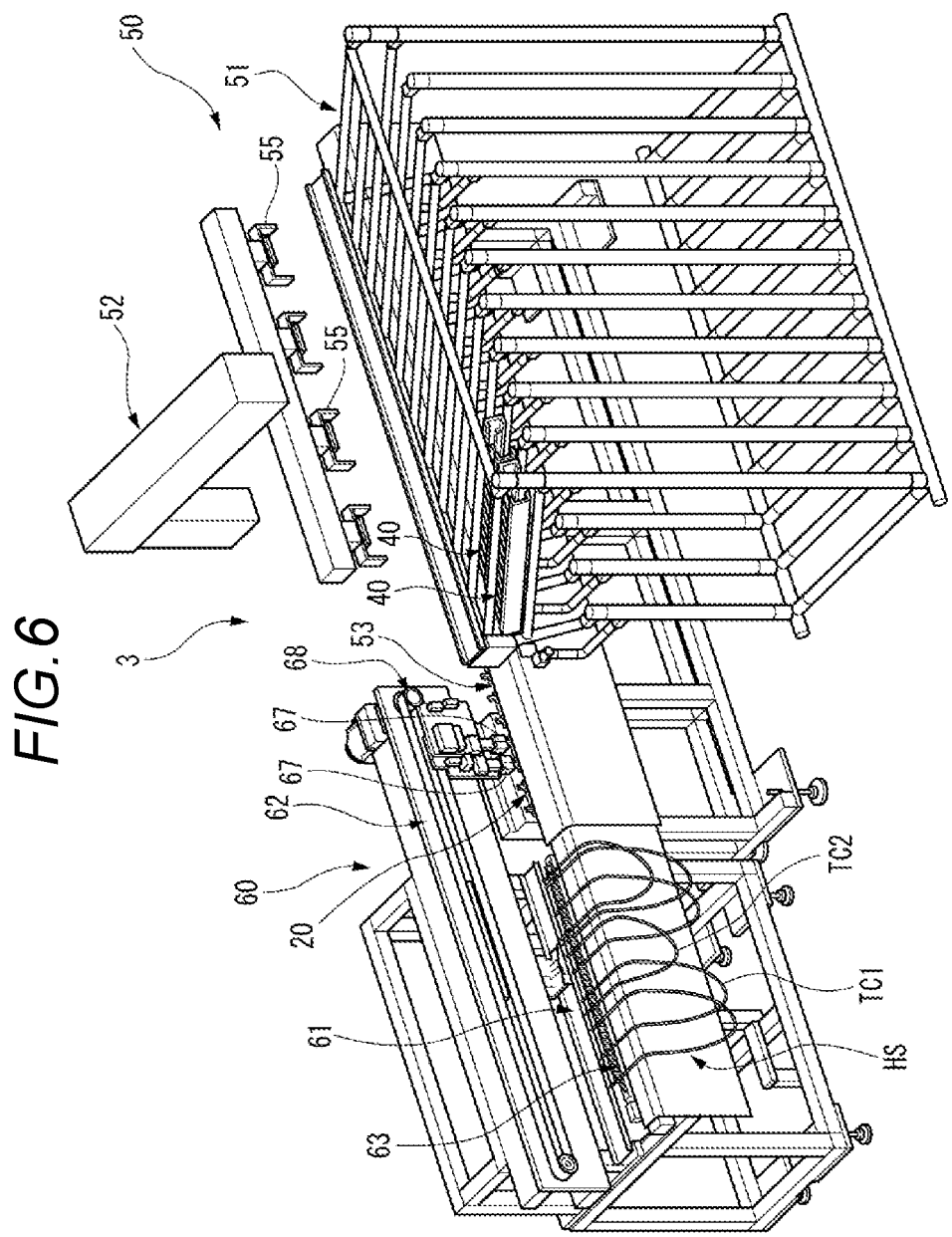
FIG. 6 is a perspective view of an electric wire set rearrangement device shown in FIG. 1.
Figure 8:
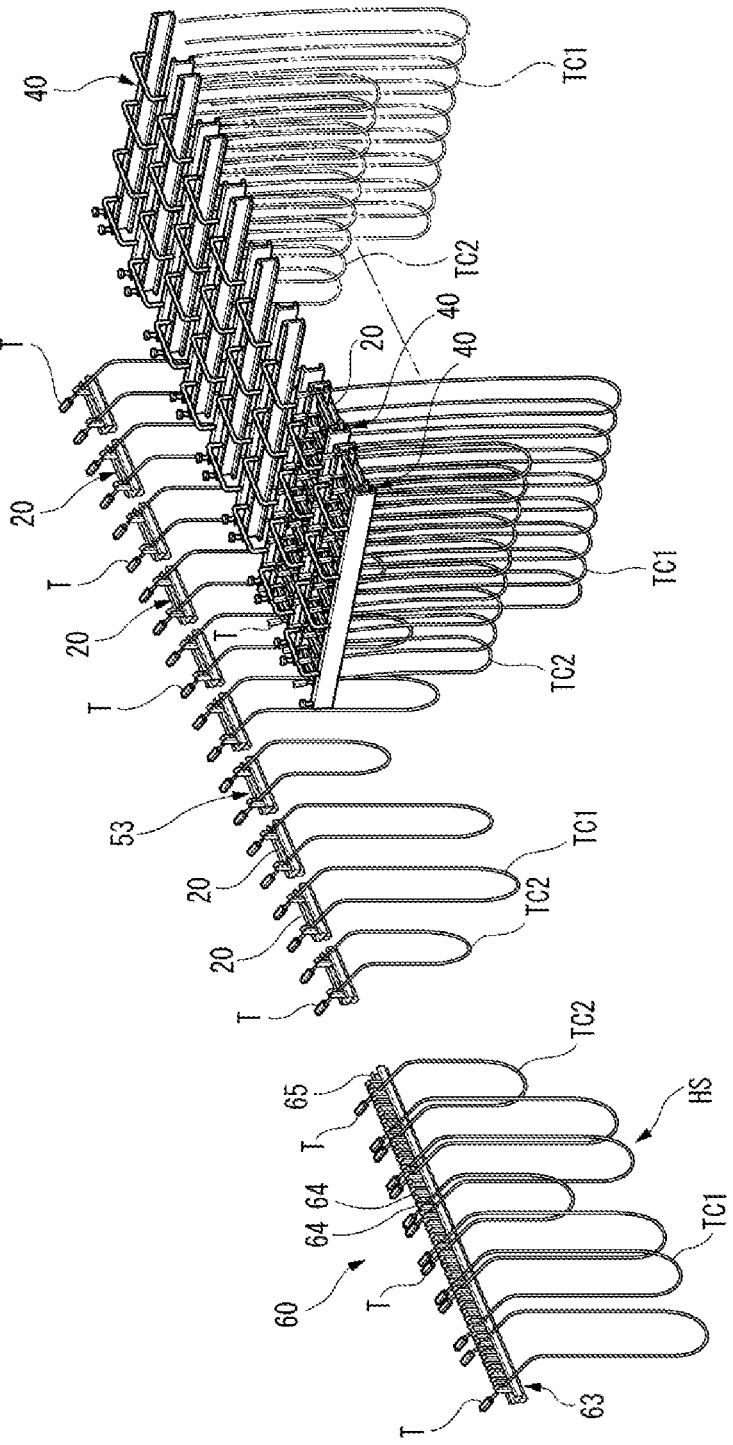
FIG. 8 is a perspective view showing an arrangement state of terminal-equipped electric wires in the electric wire set rearrangement device shown in FIG. 6.

FIG. 6 is a perspective view of the electric wire set rearrangement device 3, and FIG. 8 is a perspective view showing an arrangement state of the terminal-equipped electric wires TC1, TC2 in the electric wire set rearrangement device 3.

As shown in FIG. 6, the electric wire set rearrangement device 3 of the present embodiment is provided with a take-out device 50 and an electric wire driving device 60.

The take-out device 50 is provided with an electric wire supply stand 51, a clamp transfer device 52, and a clamp conveying device 53. In the electric wire supply stand 51, the plurality of electric wire holders 40 are arranged and supported in parallel for each type. The electric wire supply stand 51 supports the electric wire holder 40 in a state where one end side thereof is inclined to be lowered toward the clamp transfer device 52. Accordingly, the electric wire clamp 20 of the electric wire holder 40 supported by the electric wire supply stand 51 is guided to the clamp transfer device 52 by dead weight.

Figure 7:
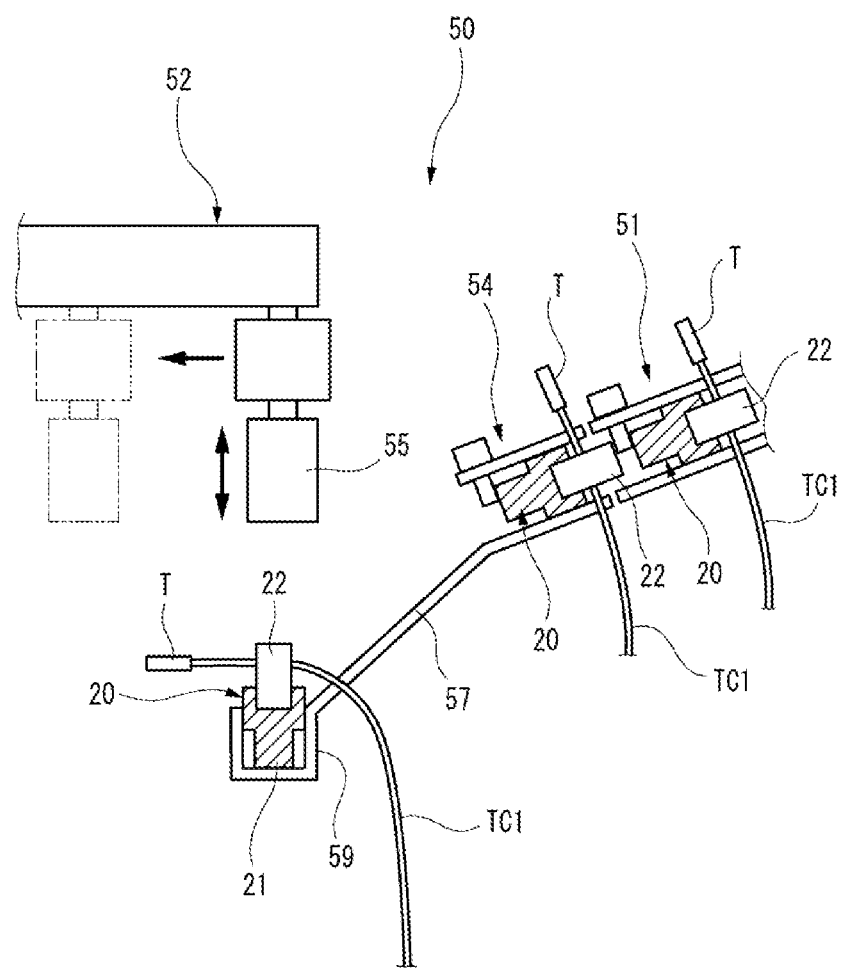
FIG. 7 is a schematic cross-sectional view of a take-out device in the electric wire set rearrangement device shown in FIG. 6.

As shown in FIG. 7, in the clamp transfer device 52, the electric wire clamp 20 which drops into a stock part 59 provided at a lower end portion of an inclined base 57 of a clamp supply device 54 connected to the lower end side of the electric wire supply stand 51 is gripped and taken out by a chuck 55, and is transferred to the clamp conveying device 53.

A clamp supplying device 54 takes out the selected electric wire clamps 20 one by one from a plurality of electric wire holders 40 arranged in parallel for each type and supplies the selected electric wire clamps 20 to the inclined base 57. The electric wire clamps 20 supplied to the inclined base 57 slide on the inclined base 57 and drop on the stock part 59. The terminal-equipped electric wire TC clamped by each electric wire clip 22 of the electric wire clamps 20 which drops on the stock part 59 is brought into a state in which the terminals T at both end portions are horizontally directed.

In the clamp conveying device 53, the plurality of electric wire clamps 20 transferred by the clamp transfer device 52 are arranged in the width direction of clamping. The clamp conveying device 53 conveys the plurality of electric wire clamps 20 which are transferred by the clamp transfer device 52 and arranged in the width direction in one direction toward a side of the downstream electric wire driving device 60.

That is, as shown in FIGS. 6 and 8, in the take-out device 50, the electric wire clamps 20 are selected and taken out from one end side of the plurality of electric wire holders 40 of the electric wire supply base 51 by the clamp transfer device 52, and are transferred to the clamp conveying device 53. The plurality of electric wire clamps 20 selected and taken out by the take-out device 50, for example, clamps a set of terminal-equipped electric wires TC1, TC2, the number and type of which is necessary for the sub harness SH to be manufactured.

The electric wire driving device 60 is provided with an electric wire clip tool support part 61 and an electric wire shifting device 62. The electric wire clip tool 63 is supported by the electric wire clip tool support part 61. The electric wire clip tool 63 includes a large number of electric wire clips 64 capable of locking the terminal-equipped electric wires TC1, TC2. In the electric wire clip tool 63, a large number of the electric wire clips 64 are supported and fixed in parallel to each other at a predetermined interval by a linear support rod 65. The electric wire shifting device 62 is provided with a pair of electric wire gripping parts 67 and a moving mechanism part 68. The electric wire gripping parts 67 grip the end portions of the terminal-equipped electric wires TC1, TC2, respectively. The moving mechanism part 68 moves the electric wire gripping parts 67 between the clamp conveying device 53 and the electric wire clip tool support part 61.

In the electric wire driving device 60, the electric wire gripping parts 67 grip and take out both end portions of the terminal-equipped electric wires TC1, TC2 of the predetermined electric wire clamps 20 of the clamp conveying device 53, respectively, and the moving mechanism part 68 moves the electric wire gripping parts 67 towards the electric wire clip tool support part 61. Further, the electric wire gripping parts 67 insert the end portions of the gripped terminal-equipped electric wire TC into the electric wire clips 64 at a predetermined position of the electric wire clip tool 63. By repeating operations of the electric wire gripping parts 67 and the moving mechanism part 68, the electric wire driving device 60 forms a harness set HS by aggregating an electric wire group which configures the crossed sub harness SH at the electric wire clip tool 63. The harness set HS is an electric wire set in which the end portions of the terminal-equipped electric wires TC1, TC2 are held in positions corresponding to works such as inserting the terminal T into a connector housing H in a predetermined order by the automatic terminal inserting device 4.

Figure 9:
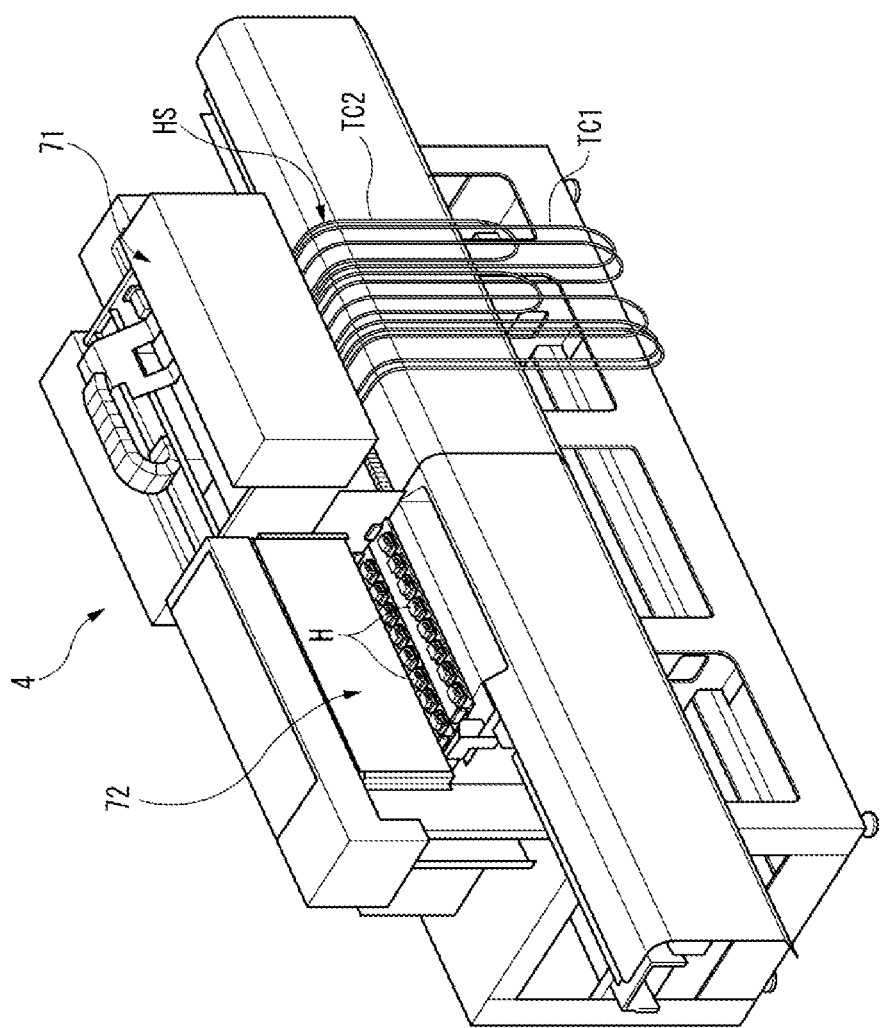
FIG. 9 is a perspective view of an automatic terminal inserting device.

As shown in FIG. 9, the automatic terminal inserting device 4 is provided with a terminal inserting mechanism part 71 and a housing supply part 72, and in the terminal inserting mechanism part 71, the harness set HS formed by the electric wire driving device 60 is installed. The housing supply part 72 supplies the connector housing H to which no electric wire is attached to the terminal inserting mechanism part 71. The automatic terminal inserting device 4 takes out the end portions of the terminal-equipped electric wires TC1, TC2 from the harness set HS in a predetermined order and inserts the terminals T connected and fixed to the end portions of the electric wires into a terminal accommodating chamber of the connector housing H supplied from the housing supply part 72. Matters disclosed in for example JP-A-2001-160472, JP-A-2001-184958, or the like may be used in the automatic terminal inserting device 4.

Next, the wire harness manufacturing method according to the wire harness manufacturing device 1 with the above-described configuration will be described by each step.

(Manufacturing Step of Standard-Size Electric Wire)

As shown in FIG. 1A, by the standard-size electric wire preparing device 10 of the electric wire lot preparing device 2, the terminal-equipped electric wire TC which is connected to the terminals T at both ends is manufactured in lot units for each of the plurality of types.

Specifically, the long electric wire C supplied to the standard-size electric wire preparing device 10 of the electric wire lot preparing device 2 is cut to a fixed length predetermined by the cutting device 11, and terminals T are crimped at both end portions of the electric wire C by the crimping devices 12A, 12B to form the terminal-equipped electric wire TC.

(Clamp Step)

The clamp device 25 of the electric wire lot preparing device 2 holds both end portions of the terminal-equipped electric wire TC, which is kept in a U shape by the electric wire clips 16a, 16b of the electric wire conveying device 16, and by inserting both end portions of those terminal-equipped electric wires TC into each electric wire clip 22 of the electric wire clamp 20 which is supplied from the clamp magazine 31, the terminal-equipped electric wire TC is clamped by the electric wire clips 22 such that the two adjacent end portions thereof face the same direction and the terminal-equipped electric wire TC is formed in a U shape. In this way, when the terminal-equipped electric wire TC is clamped by the electric wire clamp 20, both end portions of the terminal-equipped electric wire TC are in a state of being clamped by the electric wire clamp 20 and a gripping direction with respect to the terminals T is maintained, and thus it is possible to suppress the rotation around the axial direction.

(Dispensing Step)

The dispensing device 30 of the electric wire lot preparing device 2 dispenses the plurality of terminal-equipped electric wires TC which are clamped by the electric wire clamps 20 respectively to each electric wire holder 40 for each type.

(Temporary Storage Step)

By dispensing the electric wire clamps 20 through the dispensing device 30, the electric wire clamps 20 are aligned in a row at the electric wire holder 40 such that both end portions of the plurality of terminal-equipped electric wires TC face upward in parallel. Accordingly, as shown in FIG. 1B, the plurality of terminal-equipped electric wires TC1, TC2 clamped by the electric wire clamps 20 are temporarily stored at the plurality of electric wire holders 40 for each type. Incidentally, in the present embodiment, although terminal-equipped electric wires TC1, TC2 which differ in length are described as an example, in fact, ten and more types of terminal-equipped electric wires are temporarily stored at the electric wire holders 40 respectively.

Further, a part of the electric wire holders 40 is sent to a twist machine to twist the plurality of terminal-attached electric wires TC to form a twisted wire, and is sent to a wire welding machine and made special wire in a special line step such as welding a terminal.

(Take-Out Step)

Further, as shown in FIG. 1C, the plurality of electric wire holders 40 which hold a plurality of electric wire clamps 20 are stocked at the electric wire supply stand 51 of the take-out device 50 for each type. In the electric wire supply stand 51, the clamp transfer device 52 selects and takes out the electric wire clamps 20 which clamp the predetermined terminal-equipped electric wires TC1, TC2 from the plurality of electric wire holders 40 supported in parallel for each type, and carries the electric wire clamps 20 to the clamp conveying device 53. The electric wire clamps 20 which are selected and taken out are electric wire clamps 20 which clamp the plurality of types of terminal-equipped electric wires TC1, TC2 respectively corresponding to the predetermined harness set HS based on the sub harness to be manufactured.

(Electric Wire Driving Step)

Both end portions of the terminal-equipped electric wires TC1, TC2, which are taken out from each electric wire holder 40, loaded on clamp conveying device 53 and clamped by the electric wire clamp 20 are respectively locked to the particularly set electric wire clip tool 63. Accordingly, the electric wire group configuring the sub harness SH is aggregated at the electric wire clip tool 63 to form the crossed harness set HS. Specifically, the electric wire shift device 62 of the electric wire driving device 60 holds the terminal-equipped electric wires TC1, TC2 of the electric wire clamp 20 which are conveyed by the clamp conveying device 53, with the electric wire gripping part 67 and takes the terminal-equipped electric wires TC1, TC2 out. Further, the moving mechanism part 68 moves the electric wire gripping part 67 to the electric wire clip tool supporting part 61 and the electric wire gripping part inserts the end portions of the terminal-equipped electric wires TC1, TC2 which are held into the electric wire clips 64 of predetermined positions of the electric wire clip tool 63. Further, the operations of the electric wire gripping part 67 and the moving mechanism part 68 are repeated, and as shown in FIG. 1D, the harness set HS driven by the electric wire clip tool 63 is formed.

(Housing Inserting Step)

As shown in FIG. 1E, the end portions of the terminal-equipped electric wires TC1, TC2 are taken out appropriately from the harness set driven by the electric wire clip tool 63 in a predetermined order by the automatic terminal inserting device 4, and terminals T which are connected to the electric wire end portions are inserted into the terminal accommodating chamber of the connector housing H. Specifically, the harness set HS is set at the terminal inserting mechanism part 71 of the automatic terminal inserting device 4. Thereupon, the terminal inserting mechanism part 71 detaches the end portions of the terminal-equipped electric wires TC1, TC2 which are in a predetermined order from the harness set HS sequentially, and the terminals T which are connected and fixed to the electric wire end portions are inserted into the terminal accommodating chamber of the connector housing H supplied from the housing supply part 72.

(Harness Assembling Step)

As shown in FIG. 1F, the sub harness SH of which the predetermined terminals T are inserted into the connector housing H is sent to the harness assembling step thereafter. Incidentally, the end portions of the terminal-equipped electric wires TC1, TC2 in the sub harness SH are configured such that the terminals T are inserted into the connector housing H and the terminals T are fitted after the harness assembling step. Further, the sub harness SH to be sent to the harness assembling step may still include electric wires, for example, after being dispensed to the electric wire holder 40 in the dispensing step, and after obtaining special wire in special wire steps such as having a plurality of terminal-equipped electric wires TC twisted to form twisted wire s or having terminals welded. Further, in the harness assembling step, the sub harness SH sent from the housing inserting step or the special wire steps is assembled into a main harness or the like.

As described above, according to the wire harness manufacturing method of the present embodiment, both end portions of the terminal-equipped electric wires TC1, TC2 are in a state of being clamped by the electric wire clamp 20 and the gripping direction with respect to the terminals T is maintained, and rotation around the axial direction is suppressed, and thus insertion of terminals into the terminal accommodating chambers of the connector housing H can be easily performed. Therefore, insertion of terminals into terminal accommodating chambers of the connector housing H also becomes easy by the automatic terminal inserting device 40. Of course, also in situations where operators manually insert each terminal T into the connector housing H, by maintaining orientation of the terminals T during each step, the workability is improved.

Further, the plurality of terminal-equipped electric wires TC1, TC2 which are temporarily stored at the electric wire holder 40 by the electric wire clamp 20 can be delivered to the next step either by unit of electric wire holder or by unit of electric wire clamp, and the flexibility of system design is high.

Further, in the wire harness manufacturing method according to the present embodiment, the electric wire clamp 20 which clamps the predetermined terminal-equipped electric wires TC1, TC2 are taken out appropriately in the take-out step from the plurality of electric wire holders 40 for each stocked type.

Therefore, the plurality of electric wire clamps 20 can be transferred to the next driving step in an aligned state in a predetermined order corresponding to the harness set HS and additional operations of the operators such as carrying and rearranging can be reduced.

Further, in the wire harness manufacturing device 1 according to the present embodiment, both end portions of the terminal-equipped electric wires TC1, TC2 are maintained in the gripping direction with respect to the terminals T in a state of being clamped by the electric wire clamp 20, and thus rotation around the axial direction is suppressed. Therefore, it is possible to insert the terminals into terminal accommodating chambers of the connector housing H by the automatic terminal inserting device 4 and to improve productivity by labor saving of production staff.

Next, the wire harness manufacturing method according to other embodiments of the present invention will be described.

The wire harness manufacturing method according to other embodiments includes an inspection step where connection state of the terminals which are connected and fixed to the end portions of the terminal-equipped electric wire is inspected after the clamp step where terminal-equipped electric wire TC is clamped by the pair of electric wire clips 22 of the electric wire clamp 20.

Figure 10:
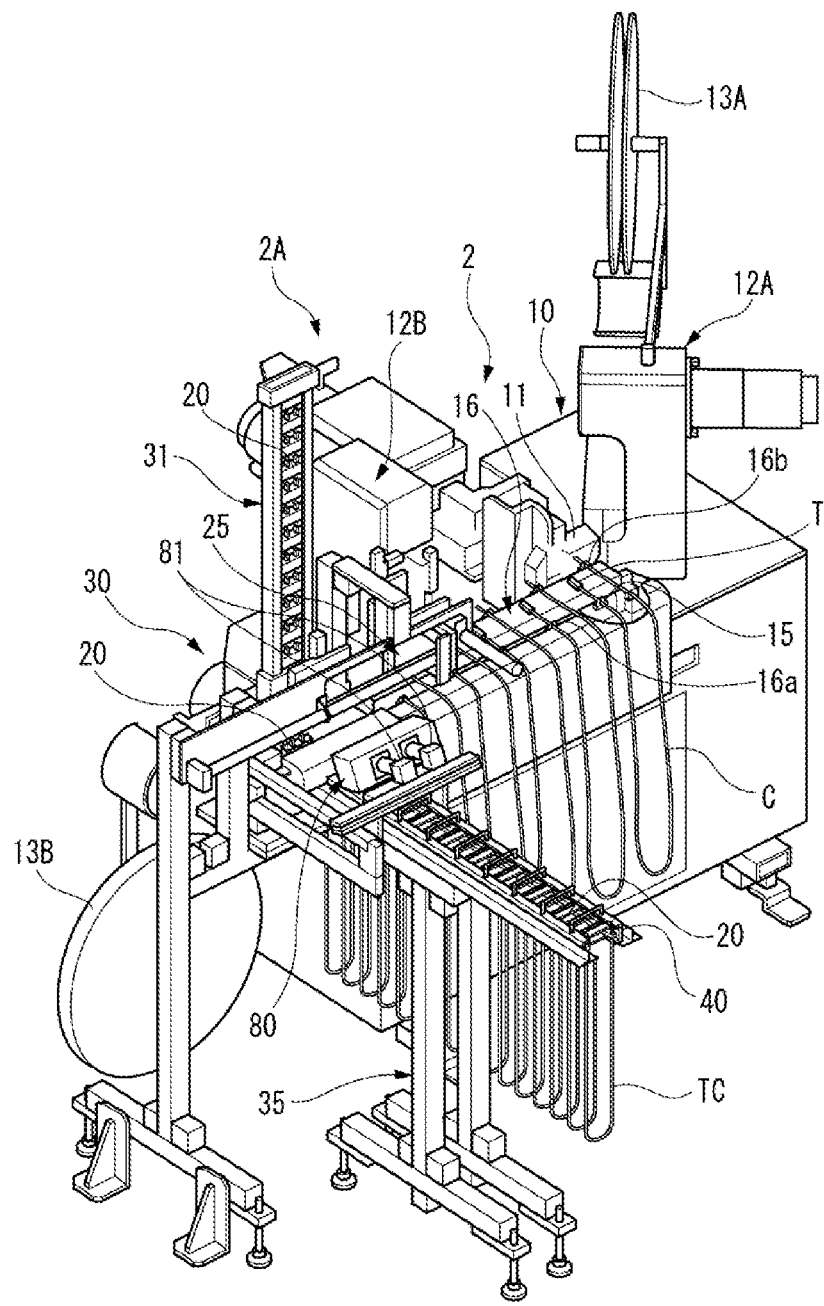
FIG. 10 is a perspective view of an electric wire lot preparing device according to another embodiment.

Specifically, as shown in FIG. 10, the electric wire lot preparing device 2A includes a camera inspecting device 80 which inspects the terminals T of the terminal-equipped electric wire TC collectively. The camera inspecting device 80 is provided at the dispensing device 30 for the electric wire lot preparing device 2A. The camera inspecting device 80 includes a pair of cameras 81.

Figure 11:
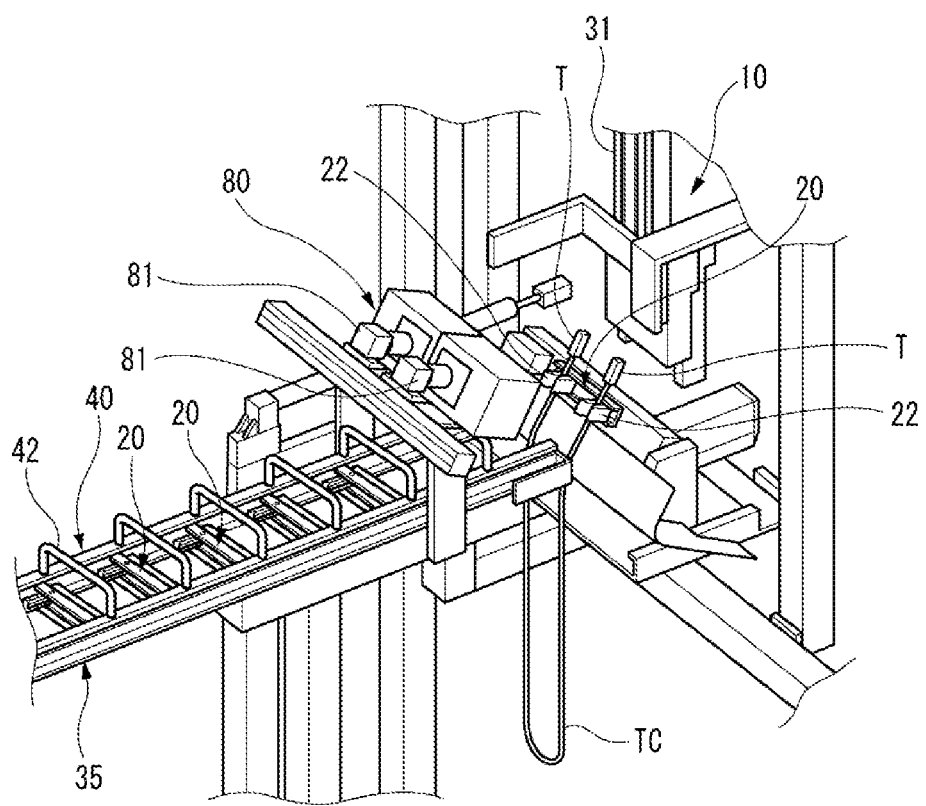
FIG. 11 is a main portion perspective view of a dispensing device in the electric wire lot preparing device shown in FIG. 10.

Namely, by the camera inspecting device 80, in the dispensing step after the clamp step, inspection will be performed where the connection state of the terminals T which are connected and fixed to the end portions of the electric wire C is inspected. Specifically, as shown in FIG. 11, in the dispensing device 30, the electric wire clamp 20 which holds both end portions of the terminal-equipped electric wire TC is rotated by 90 degrees and each terminal T which is raised upward when is dispensed is photographed by each camera 81. Further, based on pictures photographed by the cameras 81 of the camera inspecting device 80, for example, the connection state of the terminals T or the presence of deformation of the terminals T are inspected.

Accordingly, since inspection of the connection state of the terminals T are performed by the camera inspecting device 80 in the inspecting step, in-step inspection where the connection state of the terminals T is inspected can be automated, and improvement in quality and productivity can be realized.

Moreover, in the inspecting step, the terminal-equipped electric wire TC are clamped in a close proximity state where both end portions of the terminal-equipped electric wire TC face the same direction by the electric wire clamp 20, and a connection state of c the terminals T connected to both end portions can be inspected by the camera at a time.

Further, by performing camera inspection during the dispensing step, as shown in FIG. 11, the cameras 81 can be arranged at optimal positions (obliquely upward positions without interference with other devices) with respect to both end portions of the terminal-equipped electric wire TC.

The present invention is not limited to the above-described embodiment and may be appropriately modified, improved, or the like. Besides, materials, shapes, dimensions, numbers, arrangement places or the like of the configuration elements in the above-described embodiments are arbitrary and not limited as long as the present invention can be achieved.

Further, the present application is based on Japanese Patent Application (Patent Application No. 2016-109043) applied on May 31, 2016, contents of which are incorporated herein as reference.

Here, characteristics of the embodiments of the wire harnesses manufacturing method and the wire harnesses manufacturing device according to the present invention described above are summarized briefly in the following [1] to [4], respectively.

[1] A wire harness manufacturing method comprising: manufacturing a standard-size electric wire in which a terminal-equipped electric wire (TC) which is connected to a terminal (T) at least at one end is manufactured in lot units for each type;

clamping the terminal-equipped electric wire (TC) to a pair of electric wire clips (22) of an electric wire clamp (20) so as to dispose both end portions to be adjacent in a same direction and form the terminal-equipped electric wire in a U shape;

dispensing a plurality of terminal-equipped electric wires (TC) respectively clamped by the electric wire clamps (20) to electric wire holders (40) for each type;

storing the plurality of the terminal-equipped electric wires (TC) temporarily in the electric wire holders (40) for each type through the plurality of electric wire clamps (20) aligned in a row so that a plurality of the both end portions face upward in parallel;

locking an electric wire driving step in which the both end portions of the terminal-equipped electric wire (TC) clamped by the electric wire clamp (20) taken out from the electric wire holder (40) to an electric wire clip tool (63) respectively, and aggregating an electric wire group configuring a wire harness at the electric wire clip tool (63) so as to form a harness set (HS); and detaching a housing inserting step in which the end portions of the terminal-equipped electric wire (TC) from the harness set (HS) in a predetermined order and the terminal (T) connected and fixed are inserted into a terminal accommodating chamber of a connector housing (H).

[2] The wire harness manufacturing method described in [1], wherein the wire harness manufacturing method further comprises selecting and taking out at least one of the electric wire clamps (20) clamping the terminal-equipped electric wire (TC) which is predetermined from the plurality of electric wire holders (40) aligned in parallel for each type, before locking the both end portions of the terminal-equipped electric wire and aggregating the electric wire group configuring the wire harness at the electric wire clip tool.

[3] The wire harness manufacturing method described in [1] or [2], wherein the wire harness manufacturing method further comprises inspecting connection state of the terminals (T) which are connected and fixed to the end portions of the terminal-equipped electric wire (TC), after clamping the terminal-equipped electric wire.

[4] A wire harness manufacturing device (1) comprising:
a standard-size electric wire manufacturing device (10) in which a terminal-equipped electric wire (TC) which is connected to a terminal (T) at least at one end is manufactured in lot units for each type;

an electric wire clamp (20) which includes a pair of electric wire clips (22) which clamps the terminal-equipped electric wire (TC) respectively so as to dispose both end portions to be adjacent in a same direction and form the terminal-equipped electric wire in a U shape;

a dispensing device (30) which dispenses a plurality of terminal-equipped electric wires (TC) clamped by the electric wire clamp (20) respectively for each type;

an electric wire holder (40) which temporarily stores the plurality of terminal-equipped electric wires (TC) for each type through the plurality of electric wire clamps (20) aligned in a row so that a plurality of the both end portions of the terminal-equipped electric wires (TC) clamped by the pair of electric wire clips (22) respectively face upward in parallel;

a take-out device (50) which selects and takes out at least one of the electric wire clamps (20) which clamp the terminal-equipped electric wires (TC) which is predetermined for each type from a supply stand (51) where the plurality of electric wire holders (40) are aligned in parallel;

an electric wire driving device (60) in which the both end portions of the terminal-equipped electric wire (TC) clamped by the electric wire clamp (20) taken out from the electric wire holder (40) are locked to an electric wire clip tool (63) respectively, and an electric wire group configuring a wire harness is aggregated at the electric wire clip tool (63) so as to forms a harness set (HS); and an automatic terminal inserting device (4) which detaches the end portions of the terminal-equipped electric wire (TC) from the harness set (HS) in a predetermined order and inserts the terminals (T) which are connected and fixed into a terminal accommodating chamber of a connector housing (H).

INDUSTRIAL APPLICABILITY

According to the wire harness manufacturing method and the wire harnesses manufacturing device of the present invention, facilitation of insertion of the terminals into the terminal accommodating chambers of the housing can be realized, and since the flexibility of system design can be increased, production efficiency of the wire harness can be improved.

DESCRIPTION OF REFERENCE NUMERALS

1: wire harness manufacturing device
4: automatic terminal inserting device
10: standard-size electric wire preparing device
20: electric wire clamp
22: electric wire clip
25: clamp device
30: dispensing device
40: electric wire holder
50: take-out device
51: electric wire supply stand
60: electric wire driving device
63: electric wire clip tool
HS: harness set
T: terminal
TC: terminal-equipped electric wire

The invention claimed is:

1. A wire harness manufacturing method comprising:
manufacturing a standard-size electric wire in which a terminal-equipped electric wire which is connected to a terminal at least at one end is manufactured in lot units for each type;
clamping the terminal-equipped electric wire to a pair of electric wire clips of an electric wire clamp so as to dispose both end portions to be adjacent in a same direction and form the terminal-equipped electric wire in a U shape;
dispensing a plurality of terminal-equipped electric wires respectively clamped by a plurality of electric wire clamps to electric wire holders for each type;
storing the plurality of the terminal-equipped electric wires temporarily in the electric wire holders for each type through the plurality of electric wire clamps aligned in a row so that a plurality of the both end portions face upward in parallel;
locking the both end portions of the terminal-equipped electric wire clamped by the electric wire clamp taken out from the electric wire holder to an electric wire clip tool respectively, and aggregating an electric wire group configuring a wire harness at the electric wire clip tool so as to form a harness set; and
detaching the end portions of the terminal-equipped electric wire from the harness set in a predetermined order and inserting the terminal connected and fixed into a terminal accommodating chamber of a connector housing.

2. The wire harness manufacturing method according to claim 1,
wherein the wire harness manufacturing method further comprises selecting and taking out at least one of the electric wire clamps clamping the terminal-equipped electric wire which is predetermined from the plurality of electric wire holders aligned in parallel for each type, before locking the both end portions of the terminal-equipped electric wire and aggregating the electric wire group configuring the wire harness at the electric wire clip tool.

3. The wire harness manufacturing method according to claim 1,
wherein the wire harness manufacturing method further comprises inspecting connection state of the terminals which are connected and fixed to the end portions of the terminal-equipped electric wire, after clamping the terminal-equipped electric wire.

4. A wire harness manufacturing device comprising:
a standard-size electric wire manufacturing device in which a terminal-equipped electric wire which is connected to a terminal at least at one end is manufactured in lot units for each type;
an electric wire clamp which includes a pair of electric wire clips which clamps the terminal-equipped electric wire respectively so as to dispose both end portions to be adjacent in a same direction and form the terminal-equipped electric wire in a U shape;
a dispensing device which dispenses a plurality of terminal-equipped electric wires clamped by the electric wire clamp respectively for each type;
an electric wire holder which temporarily stores the plurality of terminal-equipped electric wires for each type through the plurality of electric wire clamps aligned in a row so that a plurality of the both end portions of the terminal-equipped electric wires clamped by the pair of electric wire clips respectively face upward in parallel;
a take-out device which selects and takes out at least one of the electric wire clamps which clamp the terminal-equipped electric wires which is predetermined for each type from a supply stand where the plurality of electric wire holders are aligned in parallel;
an electric wire driving device in which the both end portions of the terminal-equipped electric wire clamped by the electric wire clamp taken out from the electric wire holder are locked to an electric wire clip tool respectively, and an electric wire group configuring a wire harness is aggregated at the electric wire clip tool so as to forms a harness set; and
an automatic terminal inserting device which detaches the end portions of the terminal-equipped electric wire from the harness set in a predetermined order and inserts the terminals which are connected and fixed into a terminal accommodating chamber of a connector housing.

* * * * *